United States Patent [19]
Ni

[11] Patent Number: 5,432,997
[45] Date of Patent: Jul. 18, 1995

[54] METHOD OF MAKING AN ELONGATED WELDING ELECTRODE

[76] Inventor: Jian M. Ni, 225 Nugget Avenue, Unit 12, Scarborough, Ontario, Canada, M1B 3L2

[21] Appl. No.: 195,444

[22] Filed: Feb. 7, 1994

[51] Int. Cl.⁶ ............................................. H01R 43/00
[52] U.S. Cl. ................................ 29/825; 219/145.21; 219/145.23
[58] Field of Search ................... 29/825; 219/145.23, 219/145.21

[56] References Cited

U.S. PATENT DOCUMENTS

| | | | |
|---|---|---|---|
| 1,884,713 | 10/1932 | Jerabek | 219/145.23 X |
| 2,249,085 | 7/1941 | Lange | 219/145.23 X |
| 2,308,700 | 1/1943 | Mansfield | 219/145.21 X |
| 4,552,599 | 11/1985 | Masuda et al. | 29/825 X |
| 5,199,162 | 4/1993 | Groos | 29/825 |

FOREIGN PATENT DOCUMENTS

| | | | |
|---|---|---|---|
| 46-16188 | 5/1971 | Japan | 29/825 |
| 61-7091 | 1/1986 | Japan | 219/145.23 |
| 657662 | 9/1951 | United Kingdom | 219/145.23 |

Primary Examiner—Carl J. Arbes
Attorney, Agent, or Firm—David W. Wong

[57] ABSTRACT

The elongated welding electrode made with this continuous manufacturing method is suitable for use in a continuous welding operation and it has a high conduction characteristic for the welding current. In the sequential process, an elongated welding metal wire core is continuously passed through a coating station in which a wet welding flux material is coated onto its surface. The coated wire is then passed through a pre-drying station for removing most of the moisture content from the flux material coating. The mostly dried coated wire is advanced to an abrasion station in which transverse slots are formed at evenly spaced distance along its length to form the interim welding electrode having the flux material coating in equal length segments. The wire core is exposed in the slots between the segments. A selected length of the interim electrode is then wound on a dispensing reel. Finally, a controlled amount of electric current is passed through the interim electrode wound on the reel such that heat is generated in the wire core to dry the welding flux coating completely.

9 Claims, 1 Drawing Sheet

METHOD OF MAKING AN ELONGATED WELDING ELECTRODE

BACKGROUND OF THE INVENTION

This invention relates to the method of making an elongated welding electrode and particularly a welding electrode which has a high current conduction characteristics and is suitable for continuous welding purposes.

Heretofore, welding rods have been commonly used for welding purposes in which the welding rod consists of a selected metal alloy rod about 30 centimeters long having a welding flux material coated on its surface. Such welding rods can be produced with relatively low cost and yet they provide a good quality weld in application. Furthermore, they only require a rather simple welding equipment to carry out the welding operation. However, welding rods have a relatively short length, such that in the welding operation, it often necessitates using several rods to accomplish the task. Accordingly, the weld formed in the welding operation by using such welding rods would have a plurality of weld sections formed by the use of separate new welding rods. The plurality of weld sections are thus not integrally formed and would have many joints among them. Such non-integrally formed weld sections do not form a strong bond with each other, and they are also not as smooth in appearance as an integrally formed weld. Also in application, about 2 centimeters of one end of the rod must be uncoated to provide the welding current conducting contact; and an additional 3 centimeters of the coated rod are discarded since using too short a welding rod may block the welder's sight of the spot to be welded. Thus for a common 30 centimeters long welding rod, there is at least 5 centimeters of the rod wasted. This amounts to a total of at least 15% wastage. Moreover, since the welding current must pass through the entire length of the rod to its front tip during welding, the ffective amount of current at the tip of the rod actually used for te welding operation is greatly reduced due to the inherent curent resistance of the metal rod. For the above reasons, the efficiency of using welding rod for welding is low.

Attempts have been made to produce an elongated welding electrode by providing the welding metal in a tubular form in which welding flux material is contained within the tube. However, such elongated tubular welding electrode is extremely complex and expensive to produce because of the difficulties of placing the flux material within the tube.

SUMMARY OF THE PRESENT INVENTION

It is the principal object of the present invention to provide a continuous method of producing an elongated welding electrode which can be used easily to provide a high quality weld.

It is another object of the present invention to provide a method of producing an elongated welding electrode having means to facilitate a maximum amount of current to pass through the electrode for welding purposes without virtually no resistive current loss.

It is another object of the present invention to provide a method of producing an elongated welding electrode suitable for continuous welding operation.

It is another object of the present invention to provide a method of producing an elongated welding electrode having any desired length wound on a dispensing reel.

BRIEF DESCRIPTION OF THE DRAWINGS

The invention is illustrated in the accompanying drawing which shows a diagrammatic view of the continuous method of making the welding electrode according to the present invention.

DETAILED DESCRIPTION OF THE PREFERRED EMBODIMENTS

Figure 1:
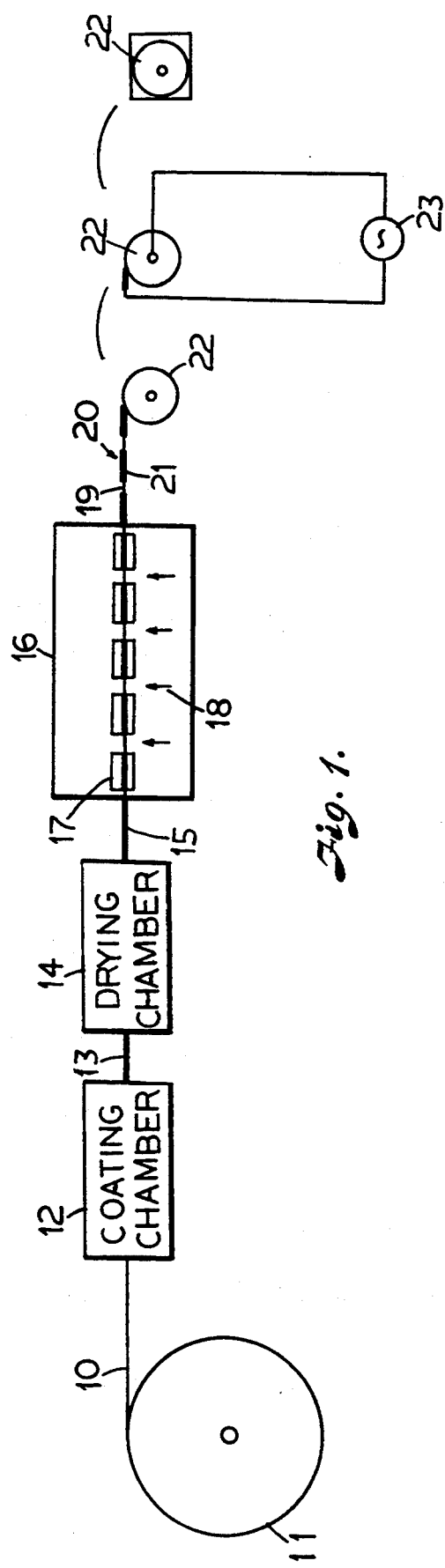

With reference to the drawing, the continuous process of making the welding electrode according to the present invention is generally shown in the schematic form. The welding electrode has an elongated wire core 10 made of a selected substantially flexible metal or metal alloy such as copper, steel or silver alloy. The wire core 10 from a supply reel 11 is passed continuously through a pressure coating station or chamber 12 in which the outside surface of the wire core 11 is continuously coated with a mixture of a wet welding flux coating such as by pressure coating. Selected aggregates such as sepiolite may be added into the welding mixture to enhance its flexibility. The coated wire core 13 is then passed through an air drying station or chamber 14 having a high temperature therein so as to remove most of the moisture from the moist welding flux coating. Normally, for the common type of slag welding flux material the drying station or chamber 12 may have a temperature in the range of about 200 Celsius to about 400 degrees Celsius and the drying time of about 5 to 8 seconds. The coated wire core 13 is partially dried in the drying chamber 14 to the state that the flux coating no long would adhere to other object contacting its surface. The partially dried coated wire core 15 is advanced through an abrasion chamber 16. A plurality of equal length tubular guards 17 is located within the abrasion chamber 16. The tubular guards 17 have a diameter larger than the partially dried coated wire core 15 and are spaced equally from the adjacent guards by a predetermined distance. When the partially dried coated wire core 15 is located at the plurality of tubular guards 17, an abrasion stream 18 is applied across the tubular guards 17 at the partially dried coated wire core 15 in the sections located at eh spaces between tubular guards, so that the portion of welding flux coating at these spaces between the tubular guards are removed by the abrasion stream 18 to form transverse circumscribing slots 19 in the flux material coating on the partially dried coated wire core 15. Alternatively, the slots 19 may be in the form of transverse slots formed in at least one side of the flux material coating. Such transverse slots may be formed by locating the partially dried coated wire core 15 through an elongated tubular guard having a plurality of transverse slot openings formed in at least one side therein. The slots 19 thus formed expose a plurality of sections of the wire core 11 equal to the width of the transverse slots 19 over the entire length of the partially dried coated wire core 15 to form an interim welding electrode 20. The interim welding electrode 20 has a plurality of equal length segments 21 of welding flux material coating separated from the adjacent segments by the equal width transverse slots 19. The interim welding electrode 20 is wound on the dispensing reel 22. A selected length of the interim welding electrode 20 may be wound on the dispensing reel 22 based on the predetermined length required for a particular welding operation. After a predetermined length of the interim welding electrode 19 has been wound on the dispense reel 20, it can then be cut. The interim welding electrode 20 wound on the reel 22 is subjected to a final drying process by applying a controlled amount of current from a current supplier 23 through the entire length of the interim welding electrode for a period of time such that the heat generated in the wire core 10 in the entire length of the interim welding electrode due to the inherent current resistance in the wire core will remove the remaining moisture from the welding flux coating to form the desired elongated welding electrode. The time period of current application may be automatically monitored by a rise of resistance or similar temperature sensor adapted to the welding electrode. The dispensing reel with the welding electrode wound thereon may then be wrapped and packaged and be ready for use. It can be appreciated by those skilled in the art that the above method can be easily adapted to a continuous production process.

The invention has been described with reference to preferred embodiments only. It will be appreciated that modifications and alterations will occur to others upon a reading and understanding of this specification and it is my intention to include all such modifications and alterations insofar as they come within the scope of the appended claims.

What is claimed is:

1. A method of making an elongated welding electrode having a high welding current efficiency comprising, coating a welding flux coating mixture on an elongated metal wire member by passing said wire member through a coating station to form a coated element, said said welding flux coating mixture being a wet mixture, drying said coated element with a substantially high temperature to dry said welding flux coating mixture coated on said coated element to form a partially dried interim element, forming a plurality of evenly spaced transverse slots in the welding flux coating of said interim element, winding a predetermined length of said interim element on a dispensing reel member, cutting said predetermined length of said interim element from said wire member, passing an electric current through said interim element wound on said reel member to generate inherent heat throughout the entire length of said interim element for removing all remaining moisture content from said welding flux coating to form said welding electrode already wound on said reel member.

2. A method of making an elongated welding electrode according to claim 1 including packaging said reel member with said welding electrode wound therein for ready use.

3. A method of making an elongated welding electrode according to claim 2 wherein said transverse slots are formed by locating said interim element in an abrasion chamber having a plurality of equal length tubular guards in which each tubular guard is evenly spaced from adjacent tubular guards, and directing an abrasion stream transverse to said interim element after said interim element having been located within said tubular guards whereby said abrasion stream removes sections of said welding flux coating from said interim element in said spaces between said tubular guards to form said transverse slots.

4. A method of making an elongated welding electrode according to claim 3 wherein said electric current is monitored by a temperature sensor means adapted at said reel member.

5. A method of making an elongated welding electrode according to claim 4 wherein said welding flux coating mixture is coated onto said metal wire member by pressure coating.

6. A method of making an elongated welding electrode according to claim 5 wherein said welding flux coating mixture contains a flexible aggregate to enhance the flexibility of said coating.

7. A method making an elongated welding electrode according to claim 6 wherein said aggregate is sepiolite.

8. A method of making an elongated welding electrode according to claim 7 said metal wire member if made of an alloy chosen from the group consisting of copper, iron and silver.

9. A method making an elongated welding electrode according to claim 8 wherein said coated element is dried in a drying chamber having a temperature in the range of above 200 Celsius to 400 degrees Celsius for a period of between 5 to 8 seconds.

* * * * *